United States Patent [19]

Murayama et al.

[11] Patent Number: 4,953,028
[45] Date of Patent: Aug. 28, 1990

[54] IMAGE SENSOR WITH CAPACITANCE ADDITION MEANS

[75] Inventors: Jin Murayama; Yoshimitsu Kudoh, both of Kanagawa, Japan

[73] Assignee: Fuji Photo Film Co., Ltd., Kanagawa, Japan

[21] Appl. No.: 465,653

[22] Filed: Jan. 19, 1990

Related U.S. Application Data

[63] Continuation of Ser. No. 159,087, Feb. 23, 1988, abandoned.

[30] Foreign Application Priority Data

Feb. 23, 1987 [JP] Japan .................................. 62-37796

[51] Int. Cl.$^5$ ............................................. H04N 5/335
[52] U.S. Cl. ........................... 358/213.31; 358/213.18; 358/213.15; 250/578.1
[58] Field of Search ....................... 358/213.31, 213.11, 358/213.15, 213.18, 213.27, 212; 250/578

[56] References Cited

U.S. PATENT DOCUMENTS 4,810,896  3/1989  Tanaka et al. ...................... 250/578

FOREIGN PATENT DOCUMENTS 70872   4/1986  Japan .
164382  7/1986  Japan .

Primary Examiner—James J. Groody
Assistant Examiner—Robert M. Bauer
Attorney, Agent, or Firm—Sughrue, Mion, Zinn, Macpeak & Seas

[57] ABSTRACT

An image sensor comprising MOS-type solid-state image pickup elements for transferring signals produced in photosensing elements to signal read-out lines through MOS-type switches. The image sensor is equipped with capacitance addition means comprising MOS-type switches and capacitance elements, whereby an additive capacitance is selectively connected to each signal read-out line.

10 Claims, 1 Drawing Sheet

IMAGE SENSOR WITH CAPACITANCE ADDITION MEANS

This is a continuation of application Ser. No. 07/159,087, filed Feb. 23, 1988, now abandoned.

1. Field of the Invention

This invention relates to an image sensor comprising MOS-type solid-state image pickup elements, and more particularly relates to an image sensor equipped with charging means for supplying charges required for resetting photosensing elements.

2. Background of the Invention

FIG. 1 shows one approach of an image sensor including a group of photosensing elements comprising plural photodiodes arranged in a matrix form, i.e., more particularly, there are shown vertical scan lines $V_1$, $V_2$, and $V_3$, and signal read-out lines $l_1$, $l_2$, and $l_3$, which are respectively arranged vertically and horizontally. While only a 3×3 matrix is shown, the structure may be expanded to an N×M configuration as known in the art. There is also shown a plurality of respective MOS-type switches, each of which is electrically connected to a photosensing element, a vertical scanning line and a signal read-out line. A switching (i.e., ON and OFF) operation of a MOS-type switch is carried out by applying a vertical scan signal through an appropriate vertical scan line $V_1$, $V_2$, and $V_3$, to the MOS-type switch, thereby to transfer a signal charge produced in a photosensing element of a signal read-out line $l_1$, $l_2$, and $l_3$. Terminals of the signal read-out lines $l_1$, $l_2$, and $l_3$, are electrically connected through MOS-type switching $T_{H1}$, $T_{H2}$, and $T_{H3}$, to a common signal read-out line Lc. One of the MOS-type switches $T_{H1}$, $T_{H2}$, and $T_{H3}$ is provided with a horizontal scan signal and is then switched to a conductive (ON) state, so that particular signals are read-out in a time series ($S_o$) from the signal read-out lines $l_1$, $l_2$, and $l_3$. Before a transfer operation, the common signal read-out line Lc is precharged to a predetermined voltage using a power source E, so that the signals ($S_o$) are outputted as negative signals with reference to the voltage E. In order to effectively utilize light incident on the photosensing element in the image sensor, a photoelectric conversion operation is carried out using photo-induced charges in conjunction with a storage operation.

The photoelectric conversion operation will be described hereinunder representatively using an exemplary picture element A, which has been illustrated in FIG. 1 as containing a photodiode PD and a MOS-type switch $T_v$.

A pn junction of the photodiode PD is reversely biased and is constructed such that incident light to the pn junction causes charges stored in a capacitance of the junction to be discharged. As a result, the amount of the charges in the junction is decreased with time after the MOS-type switch $T_v$ is switched to an OFF or equilibrium state (i.e., a state in which the capacitive junction has been precharged to voltage E). In using this approach, the amount of charges which are discharged within a predetermined period is proportional to a time-integral value of incident light within the period. As a result, a signal $S_o$ corresponding to the amount of charges required for charging the junction up to an initial voltage E, is outputting and then detected as a signal proportional to the amount of the incident light.

The above approach suffers a constraint on design limitations in that, in order to stably perform the photoelectric conversion operation by means of the storage action of the photo-induced charges and detect outputted signals with a high degree of accuracy, each of the signal read-out lines $l_1$, $l_2$, and $l_3$, which feed into common output line Lc must have a large capacitance than the junction capacitance of each photodiode. Stated differently, in order to insure that the voltage of the junction capacitance is precharged to thereby perform the storage action of the photo-induced charges on the basis of the initial voltage E, it is required that each photodiode and read-out lines $l_1$, $l_2$, and $l_3$, be so designed that the junction capacitance of a photodiode is able to be precharged rapidly during the periodic switching (i.e., ON and OFF) precharge operation of the MOS switch.

For satisfying such a requirement, the signal read-out lines $l_1$, $l_2$, and $l_3$, in one approach, have been design so as to be enlarged in width.

The above approach has been found to be unsatisfactory in several application situations, i.e., a stable operation thereof cannot be preformed in a case where a number of picture elements is very small and therefore the number of photodiodes to be connected to each signal read-out line is very small, or in a case where each photodiode is large in size, that is, in a case where a capacitance of each signal read-out line is not sufficiently large in comparison with the junction capacitance of each photodiode. Further, in a case where a number of picture elements is small, vertical portions of the signal read-out lines (i.e., $l_1$, $l_2$, and $l_3$) must be designed so as to be short in length; in such a situation it becomes increasingly difficult to provide sufficient capacitance in comparison to the junction capacitance, as the decrease in read-out line length (and therefore capacitor plate area) results in a proportional decrease in read-out line capacitance. The problem as described above also occurs in a case where the shape of a photodiode is designed to be enlarged for the improvement of a dynamic range.

As a result of the foregoing, there exists a need for an improved image sensor approach exhibiting an improvement in dynamic range to sufficiently ensure that the junction capacitance in a photodiode is able to be precharged to voltage level E within the period of a precharge operation.

SUMMARY OF THE INVENTION

In order to solve the above problem, an object according to this invention is to provide an image sensor comprising MOS-type solid-state images pickup elements, for transferring signals produced in photosensing elements by a photoelectric conversion operation thereof to signal read-out lines through MOS-type switches, characterized by being provided with capacitance addition means for selectively connecting capacitance elements to the signal read-out lines.

DETAILED DESCRIPTION OF THE PREFERRED EMBODIMENT

The preferred embodiment of this invention will be described herein with reference to the accompanying drawing.

Figure 1:
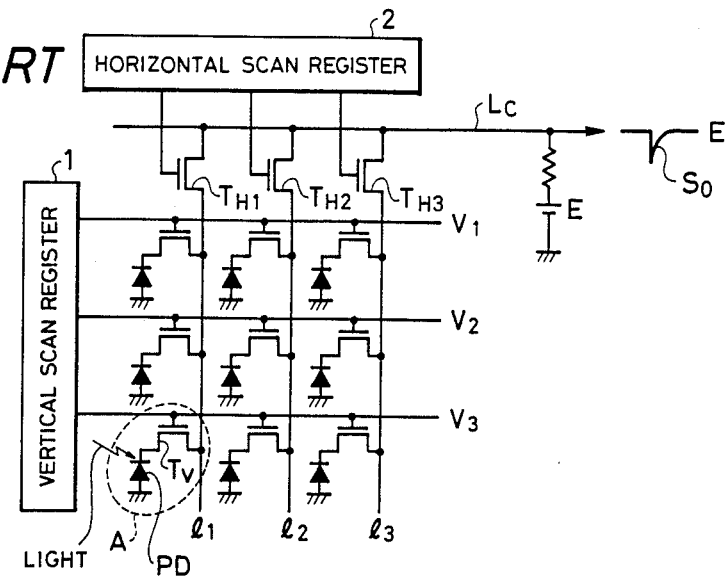
FIG. 1 is a circuit diagram of a first approach for an image sensor.
Figure 2:
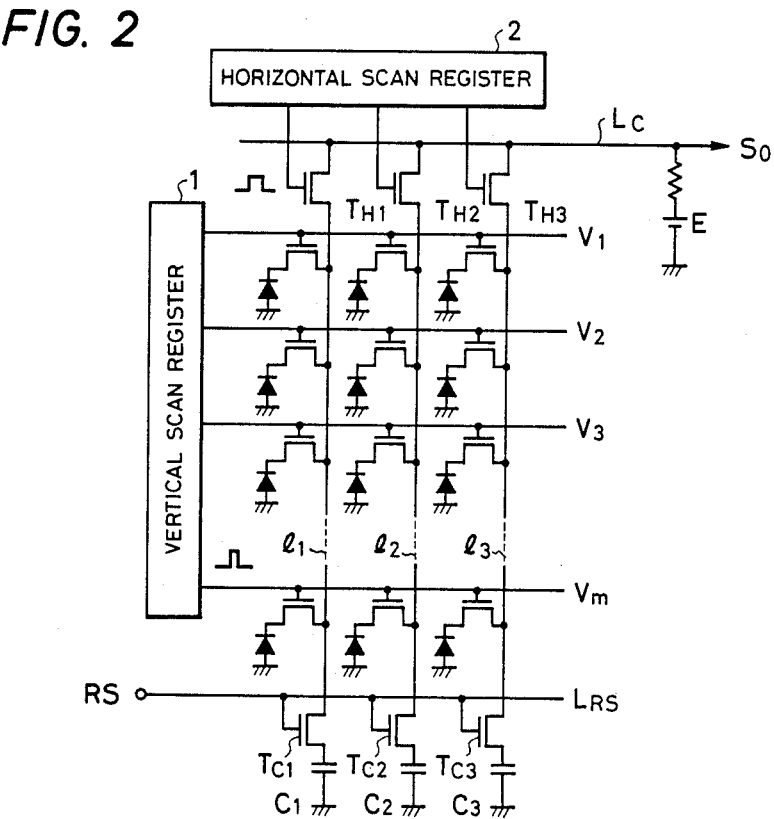
FIG. 2 is a circuit diagram of an image sensor according to this invention.

FIG. 2 is a circuit diagram of an image sensor provided with capacitance addition means. Components having the same operational functions as those shown in FIG. 1 are represented by the same reference numerals and characters.

The image sensor according to this invention has the same circuit structure as the previously-described image sensor; however, there is additionally provided capacitance addition means comprising, for example, capacitance elements (condensers) $C_1$, $C_2$, and $C_3$, each of which is connected through MOS-type switches $T_{C1}$, $T_{C2}$, and $T_{C3}$, to one end of each of signal read-out lines $l_1$, $l_2$, and $l_3$, respectively. The ON-OFF switching operation of each of the MOS-type switches $T_{C1}$, $T_{C2}$, and $T_{C3}$, is controlled by a reset signal supplied from a reset terminal RS through a reset control signal line $L_{RS}$. As one suitable construction for the capacitance elements $C_1$, $C_2$, and $C_3$, for example, MOS-type capacitors or the like may be used.

The operation of the image sensor according to this invention will be described as follows.

In a case where a large capacitance is required for each signal read-out line $l_1$, $l_2$, and $l_3$, a high-level signal is applied to the reset terminal RS to cause MOS switches $T_{C1}$, $T_{C2}$, and $T_{C3}$, to be at an ON or conducting state, such that the capacitance elements $C_1$, $C_2$, and $C_3$, are connected to the signal read-out lines $l_1$, $l_2$, and $l_3$, respectively. Due to an additive effect, the capacitance of each signal read-out line $l_1$, $l_2$, and $l_3$, is substantially increased and a junction capacitance of each photodiode can be sufficiently charged.

In a case where the capacitance of each signal read-out line $l_1$, $l_2$, and $l_3$, is sufficiently large in comparison with the junction capacitance of each photodiode, a low level signal is applied to the reset terminal RS to cause the MOS switches $T_{C1}$, $T_{C2}$, and $T_{C3}$, to be at an OFF or nonconducting state, whereby the signal read-out lines $l_1$, $l_2$, and $l_3$, are electrically separated from the capacitance elements $C_1$, $C_2$, and $C_3$, respectively.

In an effort to increase an understanding of the present invention, the followings are examples of the application of the capacitance addition means in which the capacitance elements $C_1$, $C_2$, and $C_3$, are selectively connected to and separated from the signal read-out lines $l_1$, $l_2$, and $l_3$, as described above.

In a first situation, where the capacitance of the signal read-out lines $l_1$, $l_2$, and $l_3$, is sufficient in comparison to the junction capacitance of a portion of the group of photodiodes, an image pickup operation is performed with the capacitance elements $C_1$, $C_2$, and $C_3$, being electrically separated from the signal read-out lines.

In a second situation, where plural vertical scan lines are simultaneously scanned (although in general a signal from the vertical scan register scans only one scan line), the junction capacitance is rapidly charged by connecting the capacitance elements $C_1$, $C_2$, and $C_3$, to the signal read-out lines. The following discussion is exemplary of such a situation.

When the signal read-out lines $l_1$, $l_2$, and $l_3$, are scanned one by one at a predetermined constant period (timing) to perform an ordinary read-out operation, with all the vertical scan lines scanned simultaneously, there occurs a case where presently read-out signals are removed and then it is desired to conduct the next image pickup operation as soon as possible. In such a case, an interrupt operation is required which causes the vertical scan register 1 to supply another scan signal different from the normal scan signal to vertically scan lines $V_1 \ldots V_m$, thereby to promptly eliminate unused signals. In order to perform the interrupt operation and the next image pickup operation, a capacitance sufficient for charging the junction capacitances of plural photodiodes is required for each signal read-out lines. Accordingly, the capacitance elements $C_1$, $C_2$, and $C_3$, are electrically connected to the signal read-out lines in synchronization with the interrupt operation, so that the junction capacitances can be rapidly charged and the next image pickup operation can be performed without delay.

If capacitance elements $C_1$, $C_2$, and $C_3$, are not connected to the signal read-out lines in the interrupt operation, there exists a possibility of erroneous operation. First, it takes a long time to charge the junction capacitances. Second, a signal level produced in the next image pickup operation is unreliable because the voltage of a junction capacitance of each photodiode may not reach the initial voltage E due to insufficient charging.

The image sensor with the capacitance addition means according to this invention can prevent the problems as described above.

In one embodiment, the capacitance elements may be designed at the outside of the photosensing portion, including the photosensing elements, so that picture elements can be designed with high density and high integration, and a degree of freedom for layout of the device or the like on the basis of a semiconductor integration circuit technique can be improved.

A capacitance of each capacitance element $C_1$, $C_2$, and $C_3$, is properly determined in accordance with a design choice.

As described above, an image sensor according to this invention, which is provided with capacitance addition means for selectively connecting capacitance elements to signal read-out lines, can rapidly reset the junction capacitances of photosensing elements and thereby can be actuated or operated at a high speed.

Further, the capacitance addition means may be designed or implemented with a simple structure at the outside of a photosensing portion, comprising photosensing elements, and therefore does not prevent a high density layout of photosensing elements.

Still further, the capacitance addition means can also be used to compensate for a lack of signal read-out line capacitance due to the design of the high density of photosensing elements, to improve the dynamic range of an image sensor.

What is claimed is:

1. An image sensor comprising MOS-type solid-state image pickup elements for transferring signals produced in photosensing elements to signal read-out lines through MOS-type switches, said image sensor further comprising reset capacitance addition means for selectively adding a capacitance to each of said signal read-out lines, for supplying sufficient charges required for resetting said photosensing elements during a reset operation.

2. An image sensor as claimed in claim 1, wherein said reset capacitance addition means comprises switching element means and a capacitance element.

3. An image sensor as claimed in claim 2, wherein said capacitance element comprises a condenser.

4. An image sensor as claimed in claim 2, wherein said switching element means comprises a MOS-type switch.

5. An image sensor as claimed in claim 3, wherein said switching element means comprises a MOS-type switch.

6. An image sensor as claimed in claim 5, wherein said image sensor additionally comprises addition control line means for use in selectively controlling a reset capacitive addition operation using said reset capacitance addition means, wherein each said MOS-type switch comprising said switching element means has a gate terminal controlled by a voltage applied to said addition control line means.

7. An image sensor as claimed in claim 6, wherein said reset capacitive addition means are provided as discrete devices which are subsequently interconnected to said signal read-out lines.

8. An image sensor comprising:
a plurality of MOS-type solid-state image pick-up elements, each pick-up element having a photosensing element, arranged in matrix form at the intersection of a respective one of a plurality of first scan lines and a respective one of a plurality of second scan lines orthogonally disposed with respect to said first scan lines, said second scan lines being connected to a common read-out line for transferring signals produced in said pick-up elements in response to switching signals appearing on said first scan lines, wherein the improvement comprises:
reset capacitance addition means, connected to said second scan lines, for selectively adding capacitance to each of said second scan lines, for supplying sufficient charges required for resetting said pick-up elements during a reset operation.

9. An image sensor as claimed in claim 8 further including a control line means and, wherein said capacitance addition means comprises a switching element means and a capacitive element associated with each of said second scan lines, all of said switching element means being connected in common to said control line means.

10. An image sensor as claimed in claim 9, wherein said control line means is selectively activated to operate said switching element means and to connect said capacitive elements to their respective second scan lines.

* * * * *